April 19, 1938.  A. B. ESPELAND  2,114,706
COMBINED SWEEP RAKE AND STACKER
Filed June 28, 1937  2 Sheets-Sheet 1
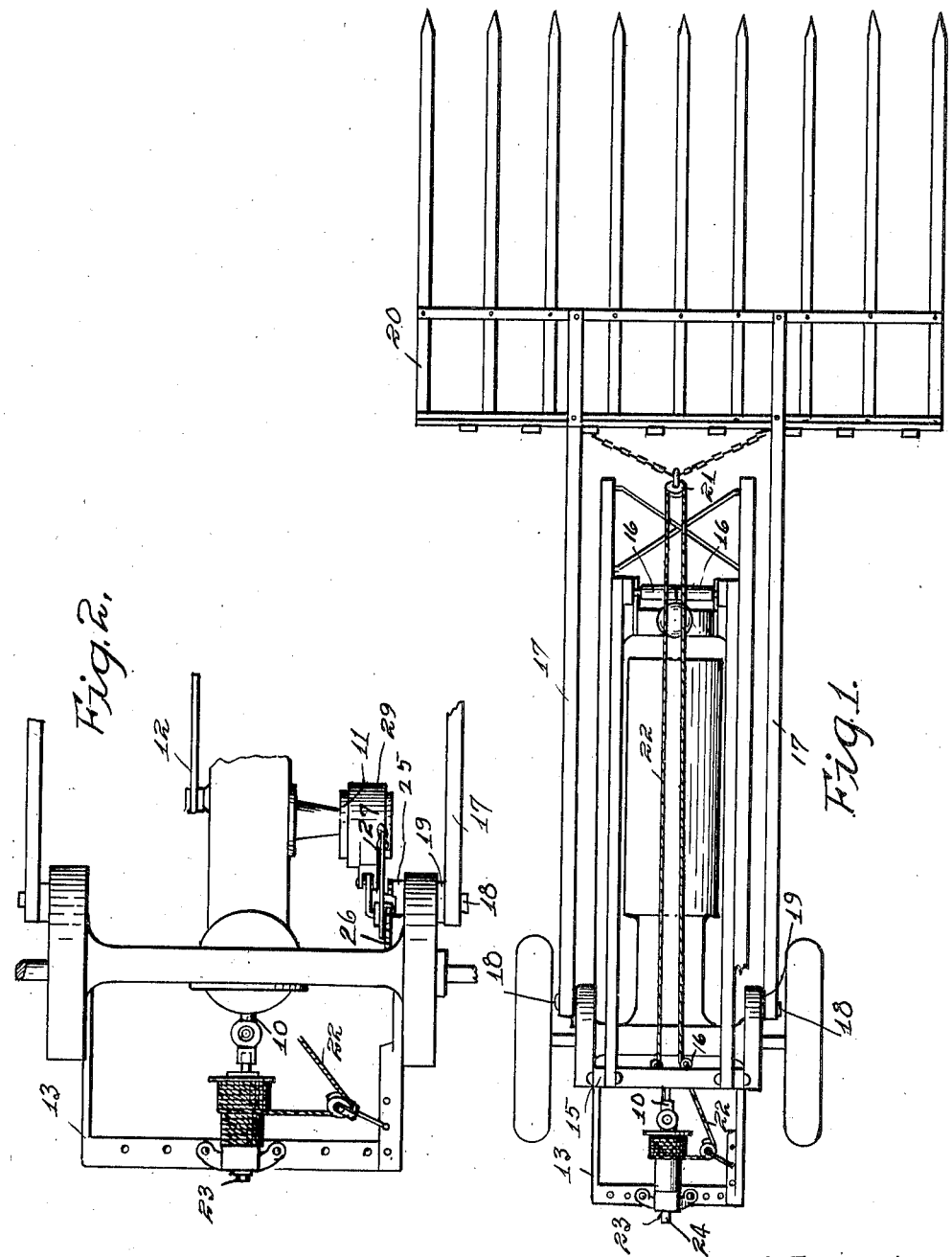
Inventor
Anthony B. Espeland
by Craig & Hager Attys April 19, 1938.  A. B. ESPELAND  2,114,706
COMBINED SWEEP RAKE AND STACKER
Filed June 28, 1937  2 Sheets-Sheet 2
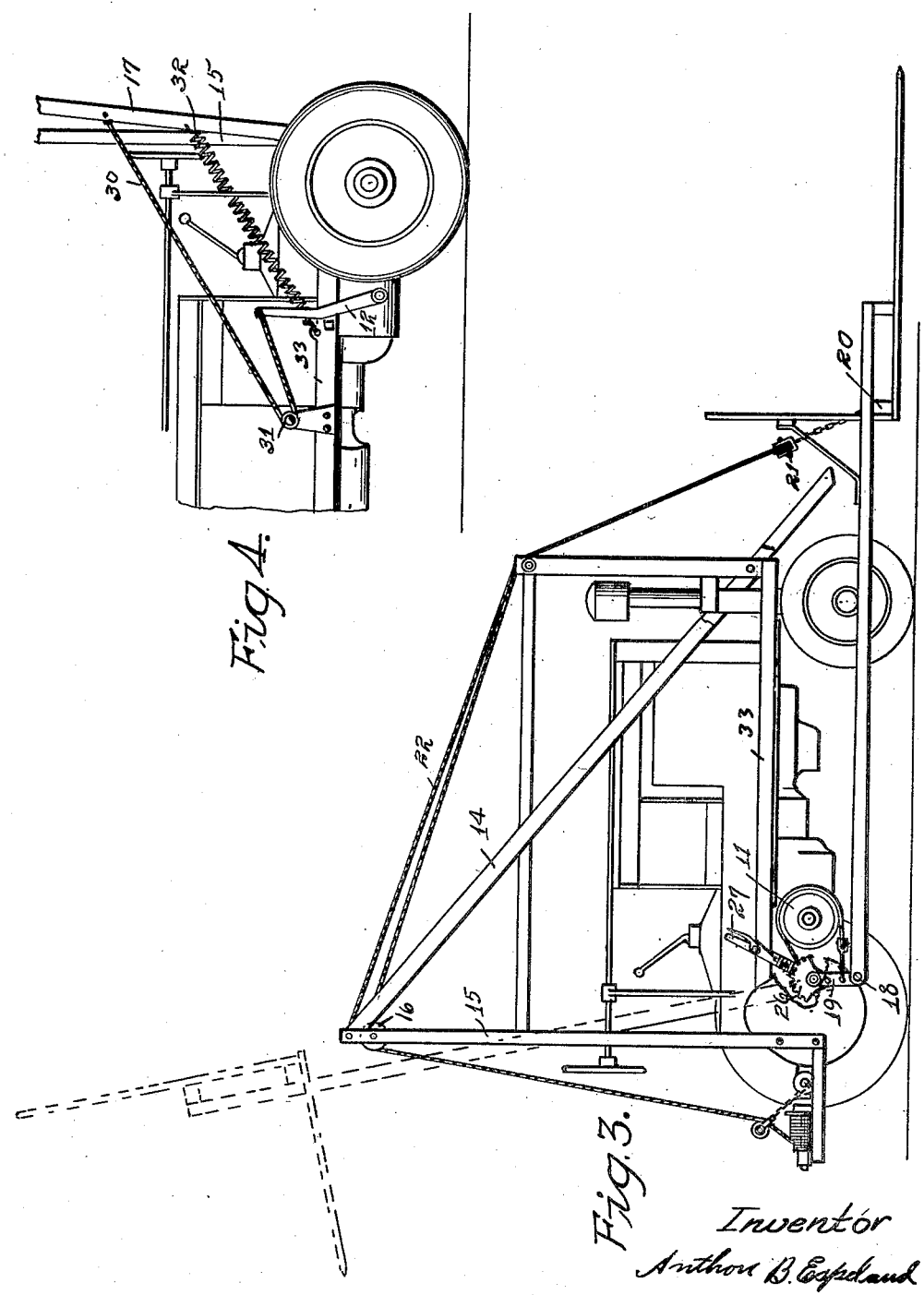
Inventor
Anthony B. Espeland
by Craig & Hague Attys Patented Apr. 19, 1938

2,114,706

UNITED STATES PATENT OFFICE 2,114,706

COMBINED SWEEP RAKE AND STACKER

Anthon B. Espeland, Humboldt County, Iowa

Application June 28, 1937, Serial No. 150,680

2 Claims. (Cl. 214—131)

The object of my invention is to provide a device of this class especially adapted to be detachably mounted on and operated by a tractor, and whereby the tractor may be moved to position for loading the sweep rake and then the entire sweep rake may be elevated by power from the tractor to position for discharging the load upon a stack and automatically returned to raking position.

A further object is to provide a device of this character especially designed to co-operate with the various parts of a tractor to thereby effect an economy in the making of the device and to enable the operator of the tractor to conveniently and easily operate the sweep rake and stacker by means of the power take-off lever of the tractor which is conveniently accessible to the operator.

More specifically, it is my object to provide means whereby the power utilized in raising the stacker is automatically released when the stacker has reached its position for discharging, and the stacker automatically returned to thereby avoid accidents and damage in case the operator fails to shut off the power at the proper time.

A further object is to provide manually operated means for holding the stacker in any position of its movement and for releasing it slowly to thereby avoid such injury as might occur if the stacker descended too rapidly.

In the accompanying drawings Figure 1 shows a top or plan view of a tractor, and my improved sweep rake and stacker applied thereto.

Figure 2 shows a detail plan view of a part of a tractor illustrating my winding shaft and brake devices applied thereto.

Figure 3 shows a side elevation of a tractor with my device applied thereto, the dotted lines showing the sweep rake in discharging position; and Figure 4 shows a detail side view illustrating the means for releasing the clutch lever and the spring for returning the sweep rake.

Referring to the accompanying drawings I shall first describe those portions of a tractor with which my sweep rake and stacker co-operate and are associated. It is to be understood that I have shown only the ordinary tractor now in general use. The reference numeral 10 indicates a power take-off, 11 a pulley which is operatively connected with the power take-off and a clutch lever 12 for operatively connecting and disconnecting the power take-off 10 and pulley 11 from the engine. At the rear of the tractor is the customary hitch bar 13.

My improvement comprises a rectangular frame 14 shaped to surround the tractor engine and engage and rest upon the tractor frame to which it is detachably bolted. Uprights 15 are fixed to the frame to support the pulleys 16. The sweep rake beams 17 are fixed to a shaft 18 which is rotatably mounted in brackets 19 extended downwardly from the frame. On the forward end of the beams 17 is a sweep rake of ordinary construction indicated generally by the numeral 20. Attached to the sweep rake 20 is a pulley 21. A cable 22 is secured at one end to the upright 15 extended forwardly over one of the pulleys 16, then under the pulley 21, then upwardly over one of the pulleys 16, then over another of the pulleys 16 and then downwardly at the rear of the tractor. By means of this arrangement a pull upon the said cable at the rear of the tractor will elevate the sweep rake.

For operating the cable 22 I have detachably secured a bearing 23 to the hitch bar 13. A winding shaft 24 is mounted in this bearing, and its forward end is shaped to enter and be non-rotatably received in the power take-off in a manner now in general use. The cable 22 is fixed to and wound about this shaft, and when the power take-off is rotated in one direction, the cable is wound upon it and the sweep rake elevated, and when the clutch lever 12 is moved to release position the power take-off and the shaft 23 are free to turn to position for permitting the sweep rake to lower.

It is desirable that the operator have full control of the lowering movement of the sweep rake to avoid accidents. For this purpose I have fixed to the frame 14 a bracket 25 having a notched sector 26, a lever 27 is pivoted to the bracket and a pawl carried thereby engages the sector 26. A brake band 29 is fixed at one end to the lever 27 and passed around the pulley 11 and has the other end secured to the bracket 25. By this means the operator may, by manipulating the lever 27, stop the rotation of the pulley 11 and its connected winding shaft 24 at any desired point in the elevation of the sweep rake, and when the power take-off is released from the engine, the operator may control the downward movement of the sweep rake by said lever 27.

For the purpose of automatically stopping the sweep rake at any desired position of its discharge movement I have attached to the clutch lever 12 a cable 30, passed around a pulley 31 on the tractor frame 33, and its other end is attached to the adjacent beam 17. The length of the cable and the position of the pulley are such that when the sweep rake approaches its discharge position the cable will pull the lever 12 to its position for releasing the power take-off clutch, and further movement of the sweep rake is prevented.

For the purpose of automatically returning the sweep rake to its lowered position I have provided a contractile coil spring 32 having one end fixed to the frame 14 and the other end fixed to the beam 17. The position and length of the spring is such that when the sweep rake reaches its discharge position the spring will be under tension, and when the clutch lever is thrown to release position, the spring will return the sweep rake to its loading position and at the same time turn the cable winding shaft to unwind the cable.

In practical operation my improved sweep rake and stacker may be quickly and easily placed upon a tractor frame and bolted in position thereon. The winding shaft is connected to the power take-off shaft of the tractor, the brake band is passed around the pulley 11 of the tractor and the cable 30 is attached to the clutch lever 12 of the tractor. Whereupon, the device is ready for use. The sweep rake is loaded in the ordinary manner and the tractor moved to the desired position for discharging the load. For this purpose the operator throws the clutch lever 12 of the tractor into operative position, and as the cable is wound upon the winding shaft by the power take-off, the sweep rake is raised to discharging position. When this point is reached the clutch lever is automatically released and the sweep rake automatically returned by the spring. The operator at all times has complete control of the movements of the sweep rake by the clutch lever and the brake lever. He may stop the sweep rake and hold it in any position and cause it to gently and slowly move in either direction. But without any attention on the part of the operator the sweep rake is stopped when its discharge position is reached, and automatically returned to starting position.

I claim as my invention:

1. A device of the class described, comprising a frame designed to be mounted upon and carried by a tractor, a shaft rotatably mounted in the frame, a sweep rake fixed to said shaft for movement from raking position to elevated discharging position, a brake drum fixed to said shaft, a brake lever pivoted to the frame, a brake band connected to the lever and co-operating with the brake drum, uprights on the frame, pulleys on said uprights, a rotatable power shaft mounted on the frame, a cable wound upon the power shaft extended over said pulleys and attached to the outer portion of the sweep rake whereby a rotation of the power shaft will elevate the sweep rake, means for detachably connecting the power shaft to the power take-off of a tractor, a cable fixed at one end to a part of the sweep rake and designed to be fixed at its other end to the lever of a tractor which throws the power take-off to and from operative position, said cable being so arranged as to move said lever to its release position when the sweep rake approaches its discharge position, and a contractile coil spring fixed to the frame and to the sweep rake in position to return the sweep rake from dumping position.

2. The combination with a tractor having a power take-off device including a shaft rotated by the tractor engine and a pulley rotated by the tractor engine and a manually operable lever for throwing the shaft and the pulley into or out of gear, a frame adapted to be mounted upon a tractor, a sweep rake pivotally carried by the frame, a winding drum, means for operatively connecting it to said power take-off shaft, a cable fixed to and wound upon the said drum and connected to the sweep rake for elevating the rake when the winding drum is rotated in one direction, means for automatically throwing the power take-off device out of gear when the sweep rake has reached the discharge position, said means being connected with and operated by the sweep rake and also connected to the said power take-off lever for throwing said lever out of gear when the sweep rake reaches discharge position, a spring for returning the sweep rake to lowered position, a brake band applied to the said power take-off pulley, and a manually operable lever connected with the brake band for controlling the lowering movement of the sweep rake.

ANTHON B. ESPELAND.